United States Patent
Quinn

(10) Patent No.: US 9,628,196 B2
(45) Date of Patent: Apr. 18, 2017

(54) INTERCONNECT SIGNAL TRANSMISSION SYSTEM

(71) Applicant: Dell Products L.P., Round Rock, TX (US)

(72) Inventor: Liam B. Quinn, Leander, TX (US)

(73) Assignee: Dell Products L.P., Round Rock, TX (US)

(*) Notice: Subject to any disclaimer, the term of this patent is extended or adjusted under 35 U.S.C. 154(b) by 419 days.

(21) Appl. No.: 13/974,740

(22) Filed: Aug. 23, 2013

(65) Prior Publication Data

US 2015/0055663 A1 Feb. 26, 2015

(51) Int. Cl.
*H04B 10/25* (2013.01)
*H04B 10/27* (2013.01)
*H04B 10/80* (2013.01)

(52) U.S. Cl.
CPC .................. *H04B 10/801* (2013.01)

(58) Field of Classification Search
None
See application file for complete search history.

(56) References Cited

U.S. PATENT DOCUMENTS

| | | | |
|---|---|---|---|
| 2008/0069570 A1* | 3/2008 | Dallesasse | 398/139 |
| 2010/0183004 A1* | 7/2010 | Kobayashi | 370/389 |
| 2013/0336334 A1* | 12/2013 | Gilbert | H04J 3/16 370/458 |
| 2014/0013024 A1* | 1/2014 | Lamm et al. | 710/313 |

\* cited by examiner

*Primary Examiner* — Awet Haile
(74) *Attorney, Agent, or Firm* — Haynes and Boone, LLP

(57) ABSTRACT

Systems and methods for transmitting interconnect signals include a source device having a first source device input connector of a first interconnect technology, a second source device input connector of a second interconnect technology, and a source device output connector. A cable includes a first connector that is coupled to the source device output connector, a second connector, and a transmission line extending between the first connector and the second connector. A receive device is coupled to the second connector. The transmission line is configured to pass a first signal of the first interconnect technology and a second signal of the second interconnect technology, received through the source device output connector by the first connector, to the second connector. The first and second signal may be multiplexed into a single stream before being passed over the transmission line, and then demultiplexed for use by the receive device.

20 Claims, 10 Drawing Sheets

US 9,628,196 B2

INTERCONNECT SIGNAL TRANSMISSION SYSTEM

BACKGROUND

The present disclosure relates generally to information handling systems (IHSs), and more particularly to an interconnect signal transmission system for transmitting interconnect signals between IHSs and/or devices connected to IHSs.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventional IHSs and IHS devices (e.g., docking stations) typically include multiple ports associated with different interconnect technologies, and thus require multiple cables to transmit interconnect signals to other IHSs or IHS devices through those ports. For example, a Universal Serial Bus (USB) cable may be required to connect a device to a USB port on an IHS, a High Definition Multimedia Interface (HDMI) cable may be required to connect a device to an HDMI port on the IHS, a Video Graphics Array (VGA) cable may be required to connect a device to a VGA port on the IHS, an Ethernet cable may be required to connect a device to an Ethernet port on the IHS, and so on. Thus, the connection of a plurality of devices to an IHS may quickly create an unmanageable number of cables. Furthermore, many devices that connect to the IHS will each include their own power cable, resulting in more cables to deal with and necessitating multiple power outlets. Further still, the IHS and/or IHS devices may only include a limited number external interconnect technology connections.

Accordingly, it would be desirable to provide improved systems and methods for transmitting interconnect signals.

SUMMARY

Systems and methods for transmitting interconnect signals include a source device having a first source device input connector of a first interconnect technology, a second source device input connector of a second interconnect technology, and a source device output connector; a cable having a first connector that is coupled to the source device output connector, a second connector, and a transmission line extending between the first connector and the second connector; and a receive device coupled to the second connector; wherein the transmission line is configured to pass a first signal of the first interconnect technology from the first connector to the second connector; and wherein the transmission line is configured to pass a second signal of the second interconnect technology from the first connector to the second connector.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
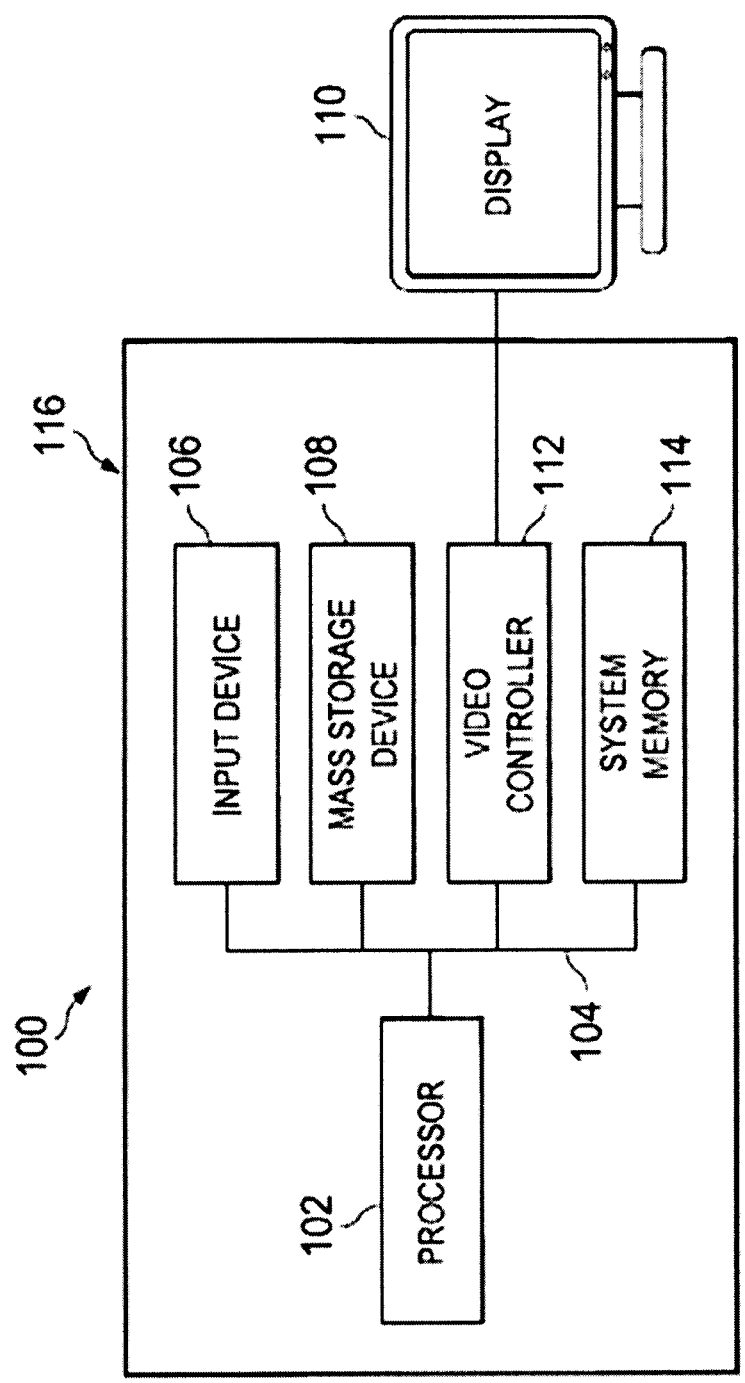
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor 102 with fast storage to facilitate execution of computer programs by processor 102. Examples of system memory 114 may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
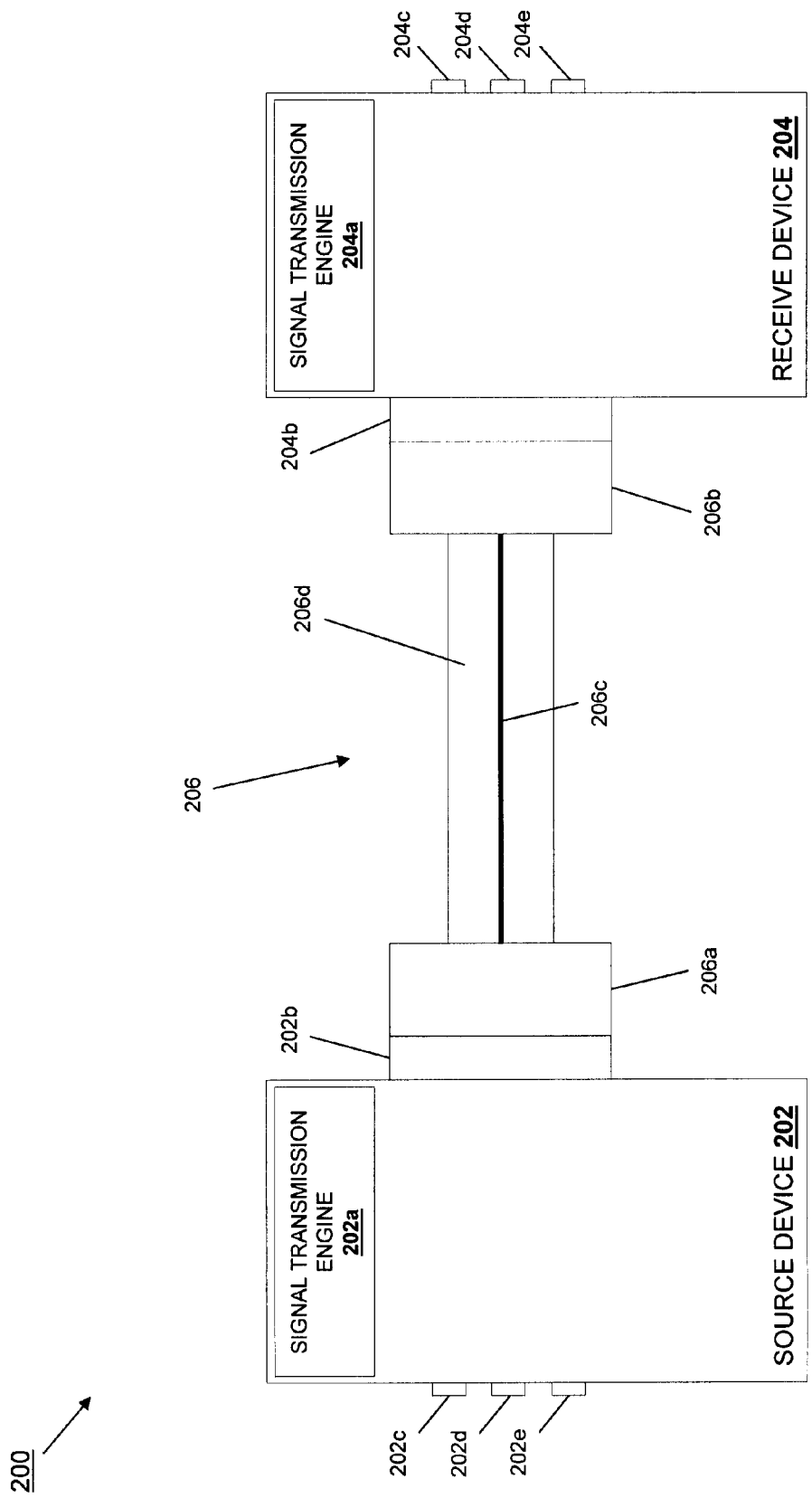
FIG. 2 is a schematic view illustrating an embodiment of an interconnect signal transmission system.

Referring now to FIG. 2, an embodiment of an interconnect signal transmission system 200 is illustrated. The interconnect signal transmission system 200 includes a source device 202 coupled to a receive device 204 by a cable 206. In an embodiment, the source device 202 may be the IHS 100, discussed above with reference to FIG. 1, and/or may include some or all of the components of the IHS 100. For example, in a specific embodiment discussed below with reference to FIG. 10, the source device 202 is an IHS display device. However, in other embodiments, the source device 202 may be one of multiple devices that are coupled together to provide an IHS, and that source device 202 may be the one of those multiple devices with the highest power demand. For example, the source device 202 may be a docking station for a mobile computer (e.g., a laptop computer, a tablet computer, a phone, etc.) that receives power from a power source and supplies that power to the mobile computer and/or other devices in the IHS, while also generating a plurality of interconnect protocols for interconnecting with those devices. While a few examples have been provided, one of skill in the art will recognize that the source device 202 may be a variety of other IHSs or IHS devices known in the art without departing from the scope of the present disclosure.

The source device 202 may include a memory (not illustrated, but which may be the storage device 108 or the system memory 114 discussed above with reference to FIG. 1) that includes instructions that, when executed by a processor included in the source device 202 (not illustrated, but which may be the processor 102 discussed above with reference to FIG. 1), cause the processor to provide a signal transmission engine 202a that includes the functionality discussed below. In an embodiment, the signal transmission engine 202a may include a control chip that processes and directs interconnect signals including, for example, controlling multiplexing according to a multiplexing scheme, ensuring sufficient throughput of interconnect signals, adding checksums to interconnect signals, allocating time for interconnect signals (e.g., in a time-division multiplexing scheme) and/or performing a variety of other control chip operations known in the art.

The source device 202 includes a source device output connector 202b, discussed below, and a plurality of source device input connectors 202c, 202d, and 202e. In an embodiment, each of the source device input connectors 202c, 202d, and 202e may be associated with a different interconnect technology such as, for example, a High-Definition Multimedia Interface (HDMI) interconnect technology, an Ethernet interconnect technology, a Universal Serial Bus (USB) interconnect technology, a Digital Visual Interface (DVI) interconnect technology, a Peripheral Components Interconnect express (PCIe) interconnect technology, a DisplayPort interconnect technology, an Integrated Drive Electronics (IDE) interconnect technology, a Serial Advanced Technology Attachment (SATA) interconnect technology, and/or a variety of other interconnect technologies known in the art. In many of the embodiments illustrated and discussed below, the source device input connectors 202c, 202d, and 202e are not included for clarity of illustration and discussion, but one of skill in the art will recognize that the interconnect signals transmitted by the source device 202 to the receive device 204 may originate from devices (e.g., peripheral devices) coupled to the source device input connectors 202c, 202d, and 202e, and/or be generated in the source device 202 itself.

In an embodiment, the receive device 204 may be the IHS 100, discussed above with reference to FIG. 1, and/or may include some or all of the components of the IHS 100. For example, in a specific embodiment discussed below with reference to FIG. 10, the receive device 202 is a computer (e.g., a desktop computer, a mobile computer, etc.) However, in other embodiments, the receive device 202 may be one of multiple devices that are coupled together to provide an IHS. For example, the source device 202 may be an IHS device coupled to a docking station. While a few examples have been provided, one of skill in the art will recognize that the receive device 202 may be a variety of other IHSs or IHS devices known in the art without departing from the scope of the present disclosure.

The receive device 204 may include a memory (not illustrated, but which may be the storage device 108 or the system memory 114 discussed above with reference to FIG. 1) that includes instructions that, when executed by a processor included in the receive device 204 (not illustrated, but which may be the processor 102 discussed above with reference to FIG. 1), cause the processor to provide a signal transmission engine 204a that includes the functionality discussed below. In an embodiment, the signal transmission engine 204a may include a control chip that processes and directs interconnect signals including, for example, controlling demultiplexing according to a multiplexing scheme, forwarding received interconnect signals to receive device components or devices connected to the receive device 204, verifying checksums associated with interconnect signals, performing error-checking, performing packet layer, link layer, or routing layer administrative tasks, and/or performing a variety of other control chip operations known in the art.

The receive device 204 includes a receive device input connector 204b, discussed below, and a plurality of receive device input/output connectors 204c, 204d, and 204e ("output connectors" herein after). In an embodiment, each of the receive device output connectors 204c, 204d, and 204e may be associated with a different interconnect technology such as, for example, an HDMI interconnect technology, an Ethernet interconnect technology, a USB interconnect technology, a DVI interconnect technology, a PCIe interconnect technology, a DisplayPort interconnect technology, an IDE interconnect technology, a SATA interconnect technology, and/or a variety of other interconnect technologies known in the art. In many of the embodiments illustrated and discussed below, the receive device output connectors 204c, 204d, and 204e are not included for clarity of illustration and discussion, but one of skill in the art will recognize that the interconnect signals received by the receive device 204 may be transmitted to devices (e.g., peripheral devices) coupled to the receive device output connectors 204c, 204d, and 204e, or be transmitted to components in the receive device 204 itself.

The cable 206 includes a first connector 206a that is configured to engage the source device output connector 202b, a second connector 206b that is configured to engage the receive device input connector 206, and a transmission line 206c that extends between the source device output connector 202b and the receive device input connector 206b. In an embodiment, the transmission line 206c may include a single twisted pair, a conductive metal such as copper, a fiber optic transmission line, and/or a variety of other transmission lines known in the art. A shielding or cover element 206d extends between the first connector 206a and the second connector 206b and about the transmission line 206c. In an embodiment, the transmission line 206c may be a series of copper cables in one sheath, a high speed optical cable including a fiber optic cable medium, and/or a variety other transmission lines known in the art. In an embodiment, the types of connectors 206a and 206b used with the transmission line 206c may depend on the cable medium, with specialized high speed electrical-to-optical driver diodes incorporated for fiber optic cable mediums, discussed in further detail below.

In the embodiments illustrated and discussed below, the interconnect signal transmission system provides for transmission of a plurality of interconnect signals of different interconnect technologies from the source device 202 to the receive device 204 through the cable 206 (or more specifically, over the transmission line 206c or transmission lines discussed below.) However, the directionality of the interconnect signal transmission discussed according to the embodiments below is provided to clearly describe the transmission of multiple interconnect signals of different interconnect technologies from one device to another, and is not necessarily limited to one direction. As such, in other embodiments, some of which are discussed below, the receive device 204 may become a source device that transmits multiple interconnect signals of different interconnect technologies through the cable 206 to the source device 202 (which in this situation becomes a receive device.) Thus, in some embodiments, the receive device 204 may include the components and functionality discussed below with regard to the source device 202, and the source device 202 may include the components and functionality discussed below with regard to the receive device 204. One of skill in the art in possession of the present disclosure will recognize that a wide variety of modification to, and combination of, the different embodiments discussed below will fall within the scope of the present disclosure.

Figure 3:
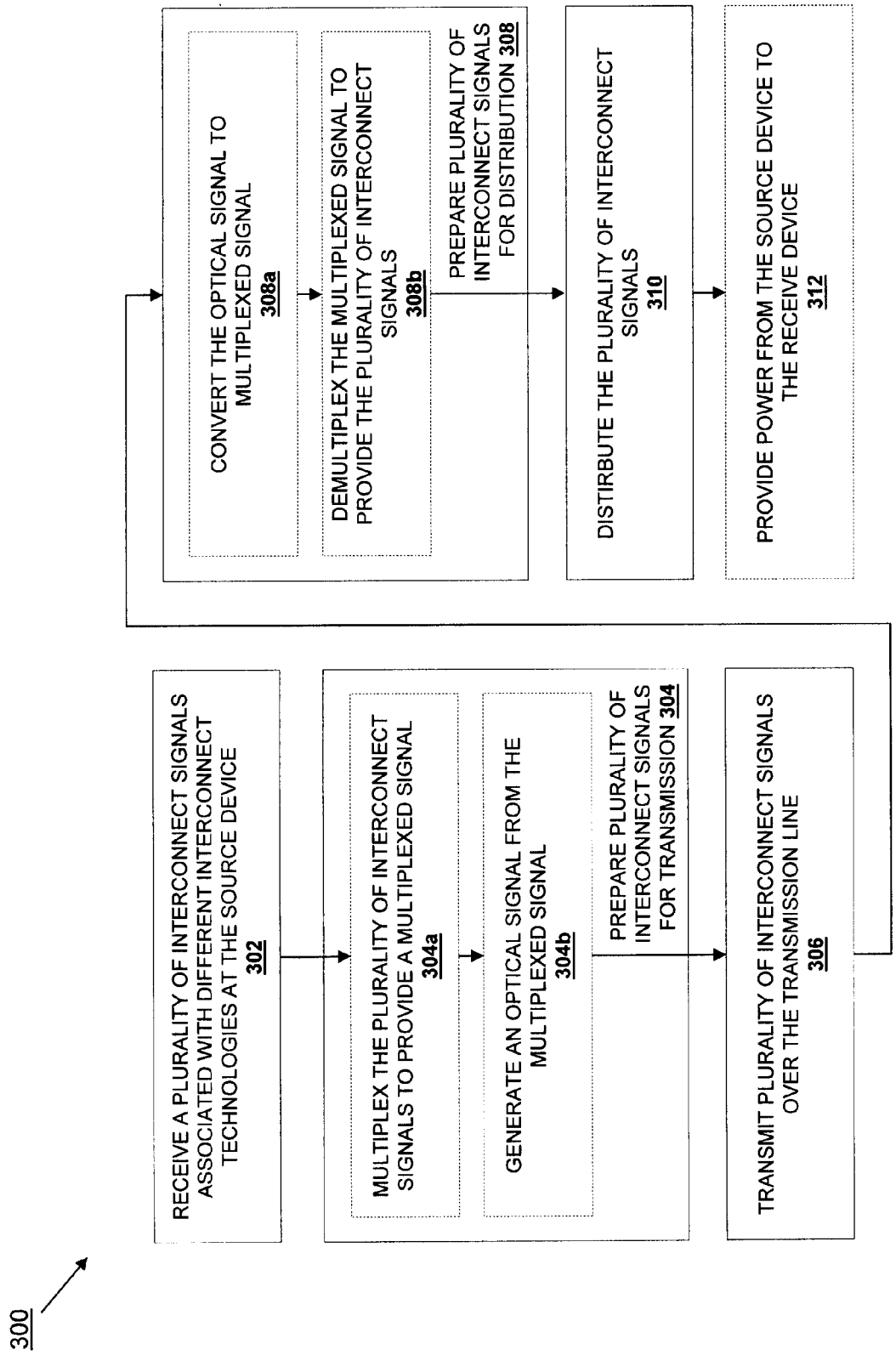
FIG. 3 is a flow chart illustrating an embodiment of a method for transmitting interconnect signals.

Referring now to FIGS. 2 and 3, an embodiment of a method 300 for transmitting interconnect signals is illustrated. In the illustrated embodiment, the method 300 includes a number of optional blocks that may be enabled by the different embodiments discussed below. However, while specific embodiments for performing particular method blocks are provided, one of skill in the art in possession of the present disclosure would recognize that a variety of other systems may be provided to perform such methods blocks while remaining within the scope of the present disclosure.

The method 300 begins at block 302 where a plurality of interconnect signals associated with different interconnect technologies are received at the source device. In an embodiment, the interconnect signals received at block 302 may include an HDMI signal of an HDMI interconnect technology, an Ethernet signal of an Ethernet interconnect technology, a USB signal of a USB interconnect technology, a DVI signal of a DVI interconnect technology, a PCIe signal of a PCIe interconnect technology, a DisplayPort signal of a DisplayPort interconnect technology, an IDE signal of an IDE interconnect technology, a SATA signal of a SATA interconnect technology, and/or a variety of other signals of a variety of other interconnect technologies known in the art. As discussed above, the interconnect signals received at block 302 may be received from devices connected to the source device 202 (e.g., through the source device input connectors 202c-d) and/or generated by the source device 202 or components in the source device 202. One of skill in the art will recognize that interconnect signals of different interconnect technologies are associated with different physical connector structure (e.g., each of the source device input connectors 202c-d may include a different physical structure) and/or different interconnect protocols. In an embodiment, an interconnect signal received at block 302 may include a signal received through one or more pins, connections, differential pairs, or other transmission components. For example, an interconnect signal received at block 302 may include a signal received through a single pin on a USB connector. In another example, an interconnect signal received at block 302 may include a plurality of signals received through a plurality of pins on an HDMI connector. In an embodiment, the cable 206 may depend on the standard used for the interconnect. For example, an HDMI cable may include electrical and mechanical specifications based on a cable type (e.g., copper), cable length, quality of cable (e.g., an electrical standard to support high speed data transmission), a connector type, mechanical tolerances, etc.

The method 300 then proceeds to block 304 where the plurality of interconnect signals are prepared for transmission. In the illustrated embodiment, block 304 of the method 300 includes a plurality of optional blocks 304a and 304b which may be performed using the embodiments of the interconnect signal transmission systems, as discussed below. However, one of skill in the art in possession of the present disclosure will recognize that the signal transmission engine 202a in the source device 202 may perform other actions on the interconnect signals received at block 302 to prepare those interconnect signals for transmission while remaining within the scope of the present disclosure. Thus, while the discussion below relates to reducing a number of signals into a smaller set of "interconnect" cables/connections (e.g., copper cables, fiber cables, etc.) through multiplexing, or reducing many I/O bus interfaces (each supporting different and various data rates) into a smaller set of high speed interconnections between source and destination platforms by multiplexing, one of skill in the art in possession of the present disclosure will recognize that other techniques will fall into the scope of the present disclosure. In several embodiments of block 304, the preparation of the interconnect signals received at block 302 for transmission does not modify the interconnect protocol of any of those interconnect signals such that each of the interconnect signals received by the source device 202 at block 302 will be transmitted natively through the cable 206 and without translation of the interconnect protocols that were associated with those interconnect signals when they were received by the source device 202.

In an embodiment, the method 300 may proceed to optional block 304a where the plurality of interconnect signals are multiplexed to provide a multiplexed signal. In some embodiments of optional block 304a, one or more multiplexers are used to multiplex a plurality of relatively lower speed interconnect signals into a multiplexed signal that may be provided as a single, relatively high speed, serial data stream. Examples of multiplexing schemes that may be used at optional block 304a includes, but are not limited to, time division multiplexing schemes, frequency division multiplexing schemes, wave division multiplexing schemes, multiplexing schemes according to the Institute of Electrical and Electronics Engineers (IEEE) standard 802.3ba-2010 and/or similar protocols, and/or a variety of other multiplexing schemes known in the art. In an embodiment, the multilplexers and transmission line(s) discussed below may include a bandwidth or bandwidth management scheme that supports the transmission of each of the interconnect signals being transmitted (e.g., a bandwidth or bandwidth management scheme that supports a bandwith that exceeds the sum of the maximum bandwidth needed to transmit each of the interconnect signals as the multiplexed signal.) A few examples of interconnect signal transmission systems are discussed below that provide for the multiplexing of the interconnect signals received at block 302, but those examples are not meant to be limiting, and a wide variety of modifications to the multiplexing components and functionality discussed below are envisioned as falling within the scope of the present disclosure.

Figure 4:
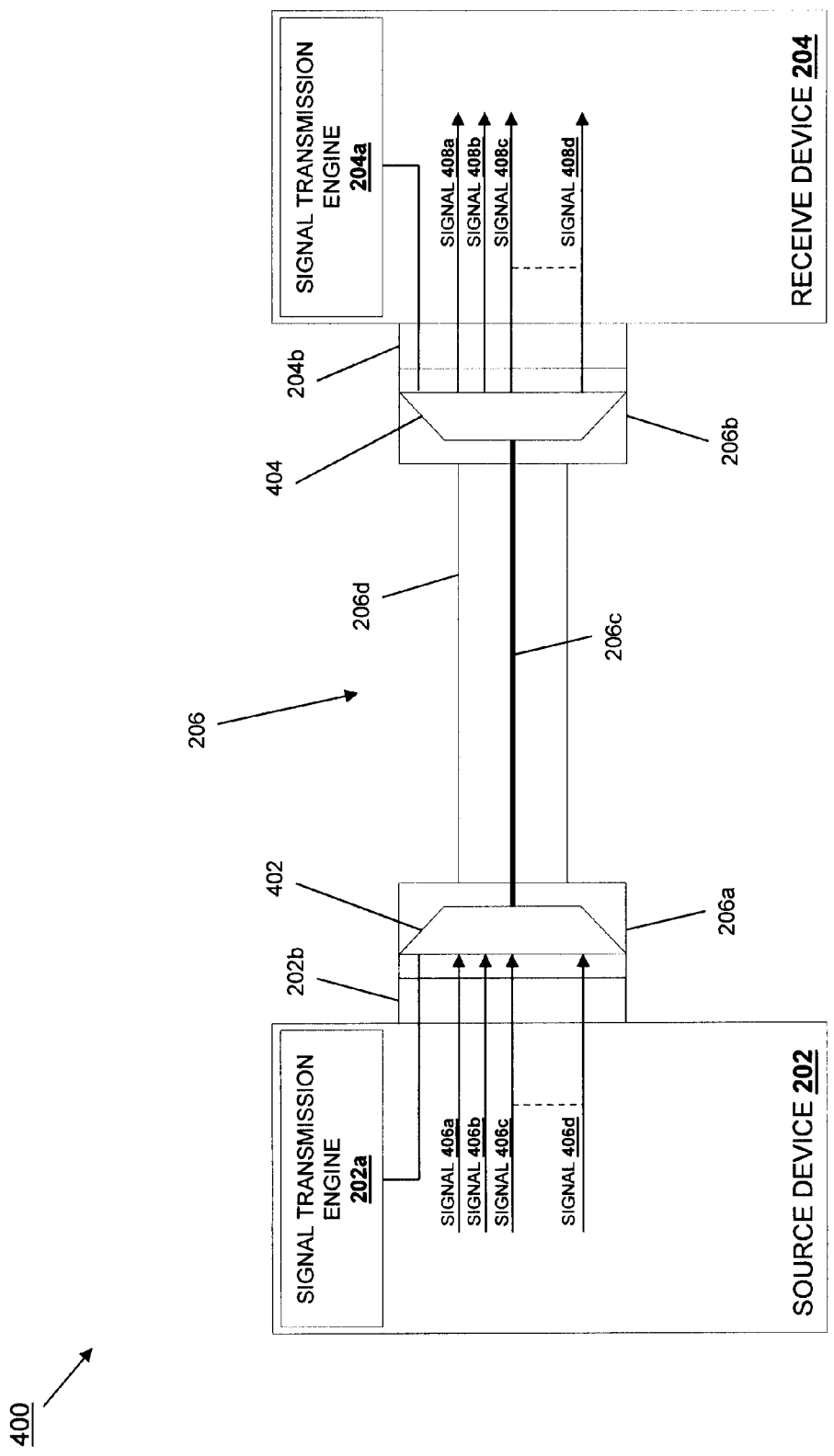
FIG. 4 is a schematic view illustrating an embodiment of the interconnect signal transmission system of FIG. 2 that provides for multiplexing and demultiplexing of interconnect signals in cable connectors.

FIG. 4 illustrates an embodiment of an interconnect signal transmission system 400 that is substantially similar to the interconnect signal transmission system 200, discussed above with reference to FIG. 2, but with the provision of multiplexing and demultiplexing components that enable optional block 304a of the method 300. As such, similar elements in the systems 200 and 400 include the same reference numbers. In the illustrated embodiment, the first connector 206a on the cable 206 includes a multiplexer 402 that is coupled to the signal transmission engine 202a in the source device 202 (e.g., through the engagement of the first connector 206a to the source device output connector 202b.) While the multiplexer 402 is illustrated as coupled to the signal transmission engine 202a in the source device 202, in other embodiments, a signal transmission engine having similar functionality to the signal transmission engine 202a in the source device 202 may be provided in the cable 206 (e.g., as memory included in the first connector 206a that includes instructions that, when executed by a processor included in the first connector 206a, causes the processor to provide a signal transmission engine that includes the functionality discussed below.) The second connector 206b on the cable 206 includes a demultiplexer 404 that is coupled to the signal transmission engine 204a in the receive device 204 (e.g., through the engagement of the second connector 206b to the receive device input connector 204b.) While the demultiplexer 404 is illustrated as coupled to the signal transmission engine 204a in the receive device 204, in other embodiments, a signal transmission engine have similar functionality to the signal transmission engine 204a in the receive device 204 may be provided in the cable 206 (e.g., as memory included in the second connector 206b that includes instructions that, when executed by a processor included in the second connector 206b, causes the processor to provide a signal transmission engine that includes the functionality discussed below.) The transmission line 206c extends between the multiplexer 402 and the demultiplexer 404.

At block 304a of the method 300, the source device 202 provides the interconnect signals (e.g., the interconnect signals 406a, 406b, 406c, and up to 406d) to the source device output connector 202b such that those interconnect signals are received by the multiplexer 402 through the connection of the first connector 206a and the source device output connector 202b. In response to receiving the interconnect signals, the signal transmission engine 202a and the multiplexer 402 operate to multiplex the interconnect signals of different interconnect technologies to provide a multiplexed signal. For example, each of the interconnect signal 406a (e.g., a USB signal), the interconnect signal 406b (e.g., an HDMI signal), the interconnect signal 406c (e.g., an Ethernet signal), and up to the interconnect signal 406d (e.g., a SATA signal) may be provided as portions of a multiplexed signal by the operation of the signal transmission engine 202a and the multiplexer 402. In an embodiment, the multiplexed signal provided by the multiplexer 402 at block 304a of the method 300 is provided as a single, serial stream of data. In an embodiment, the signal transmission engine 202a may operate to code the multiplexed signal to identify each of the interconnect signals included in the multiplexed signal. However, the optional coding of the multiplexed signal to identify the interconnect signals included in the multiplexed signal does not include re-coding the interconnect signals into a new protocol and, as such, the multiplexed signal need only be de-multiplexed at the receive device, and not de-coded. In an embodiment, the cable 206 may be configured to transmit a separate management data stream from the source device 202 to the receive device 204 that includes information that identifies each of the interconnect signals included in the multiplexed signal.

Figure 5:
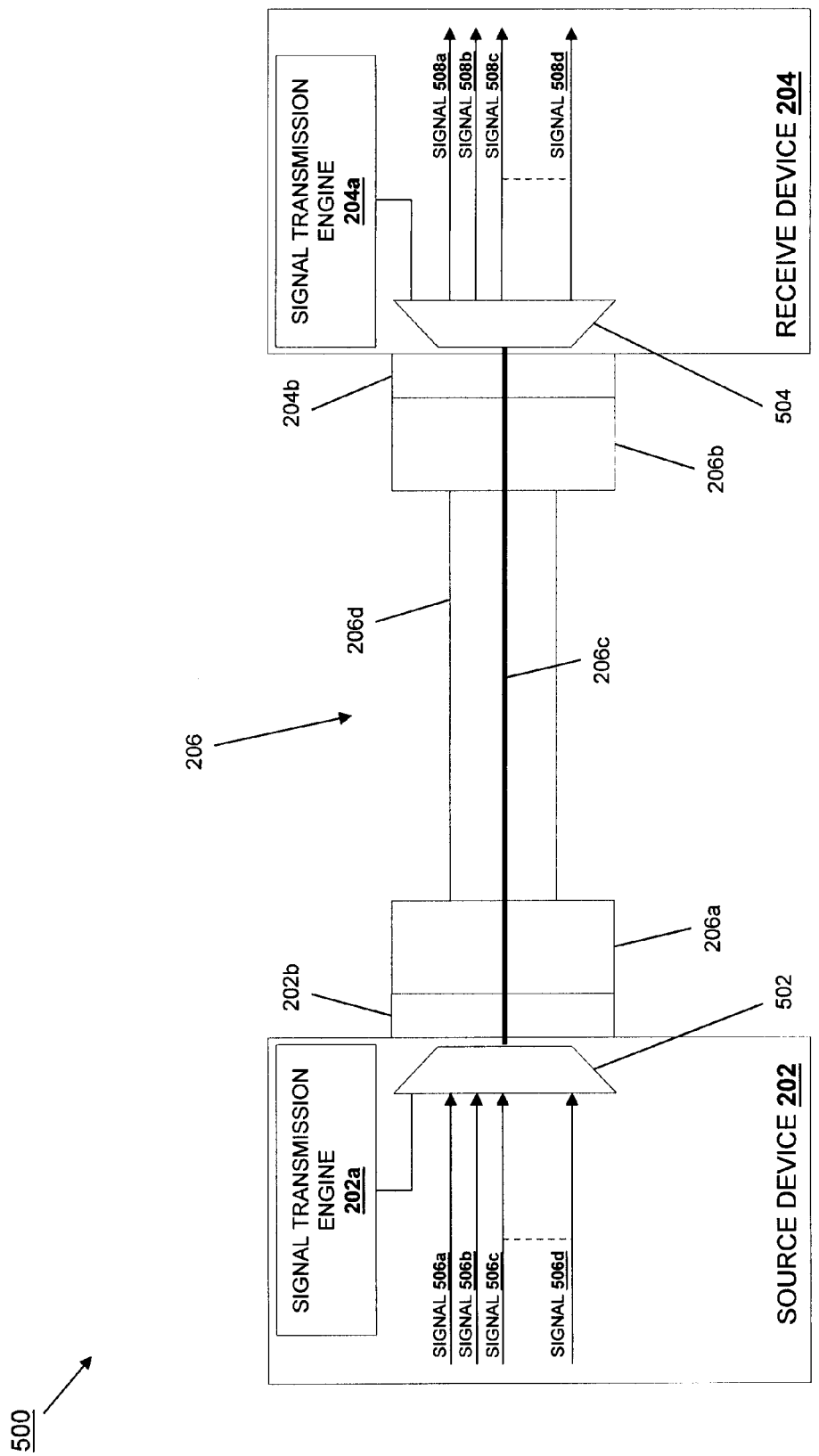
FIG. 5 is a schematic view illustrating an embodiment of the interconnect signal transmission system of FIG. 2 that provides for multiplexing and demultiplexing of interconnect signals in source and receive devices.

FIG. 5 illustrates an embodiment of an interconnect signal transmission system 500 that is substantially similar to the interconnect signal transmission system 200, discussed above with reference to FIG. 2, but with the provision of multiplexing and demultiplexing components that enable optional block 304a of the method 300 in the source and receive devices. As such, similar elements in the systems 200 and 500 include the same reference numbers. In the illustrated embodiment, the source device 202 includes a multiplexer 502 that is coupled to the signal transmission engine 202a. The receive device 204 includes a demultiplexer 504 that is coupled to the signal transmission engine 204a. The transmission line 206c extends between the multiplexer 502 and the demultiplexer 504.

At block 304a of the method 300, the source device 202 provides the interconnect signals (e.g., the interconnect signals 506a, 506b, 506c, and up to 506d) to the multiplexer 502 and, in response to receiving the interconnect signals, the signal transmission engine 202a and the multiplexer 502 operate to multiplex the interconnect signals of different interconnect technologies to provide a multiplexed signal. For example, each of the interconnect signal 506a (e.g., a DVI signal), the interconnect signal 506b (e.g., a PCIe signal), the interconnect signal 506c (e.g., an DisplayPort signal), and up to the interconnect signal 506d (e.g., an IDE signal) may be provided as portions of a multiplexed signal by the operation of the signal transmission engine 202a and the multiplexer 502. In an embodiment, the multiplexed signal provided by the multiplexer 502 at block 304a of the method 300 is provided as a single, serial stream of data. In an embodiment, the signal transmission engine 202a may operate to code the multiplexed signal to identify each of the interconnect signals included in the multiplexed signal. In an embodiment, the cable 206 may be configured to transmit a separate management data stream from the source device 202 to the receive device 204 that includes information that identifies each of the interconnect signals included in the multiplexed signal.

Figure 6:
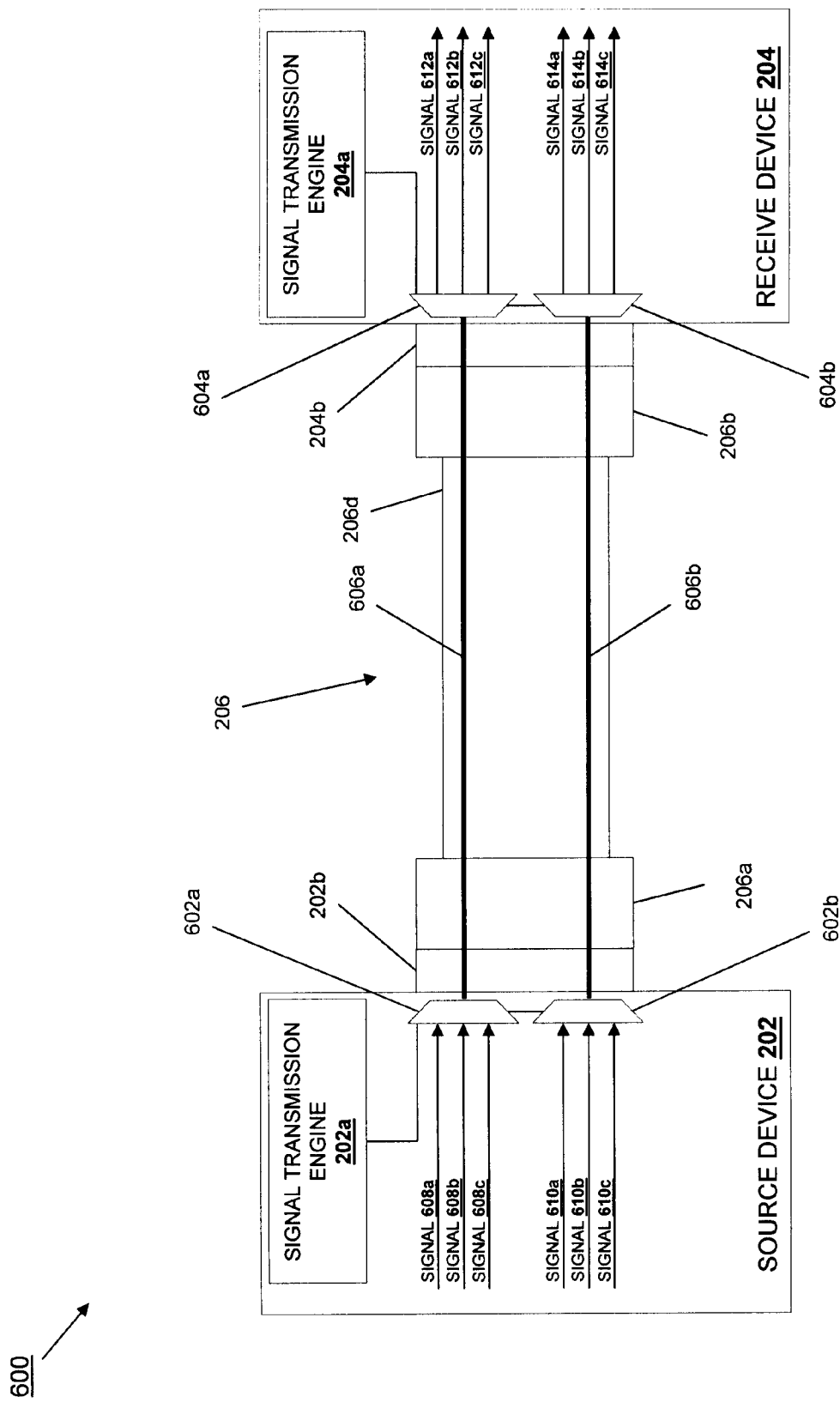
FIG. 6 is a schematic view illustrating an embodiment of the interconnect signal transmission system of FIG. 2 that includes a plurality of transmission lines that each transmit multiple interconnect signals of different interconnect technologies.

FIG. 6 illustrates an embodiment of an interconnect signal transmission system 600 that is substantially similar to the interconnect signal transmission system 200, discussed above with reference to FIG. 2, but with the provision of multiple multiplexing and demultiplexing components, along with multiple transmission lines, that enable optional block 304a of the method 300. As such, similar elements in the systems 200 and 600 include the same reference numbers. In the illustrated embodiment, the source device 202 includes a plurality of multiplexers 602a and 602b that are coupled to the signal transmission engine 202a. The receive device 204 includes a plurality of demultiplexers 604a and 604b that are coupled to the signal transmission engine 204a. The transmission line 206c of FIG. 2 is replaced by a transmission line 606a that is substantially similar to the transmission line 206c and that extends between the multiplexer 602a and the demultiplexer 604a, and a transmission line 606b that is substantially similar to the transmission line 206c and that extends between the multiplexer 602b and the demultiplexer 604b. While the multiplexers 602a and 602b are illustrated as located in the source device 202, they may be included in the first connector 206a without departing from the scope of the present disclosure. Similarly, while the demultiplexers 604a and 604b are illustrated as located in the receive device 202, they may be included in the second connector 206b without departing from the scope of the present disclosure. Furthermore, while only two multiplexers 602a and 602b, two demultiplexers 604a and 604b, and two transmission lines 606a and 606b are illustrated, additional multiplexers, demultiplexers, and transmission lines are envisioned as falling within the scope of the present disclosure.

At block 304a of the method 300, the source device 202 provides the interconnect signals (e.g., the interconnect signals 608a, 608b, and 608c) to the multiplexer 602a, and provides the interconnect signals (e.g., the interconnect signals 610a, 610b, and 610c) to the multiplexer 602b. In response to receiving the interconnect signals, the signal transmission engine 202a and each of the multiplexers 602a and 602b operate to multiplex the interconnect signals of different interconnect technologies to provide a plurality of multiplexed signals. For example, each of the interconnect signal 608a (e.g., a USB signal), the interconnect signal 608b (e.g., a DisplayPort signal), and the interconnect signal 608c (e.g., an Ethernet signal) may be provided as portions of a first multiplexed signal by the operation of the signal transmission engine 202a and the multiplexer 602a. Similarly, each of the interconnect signal 610a (e.g., a USB signal), the interconnect signal 610b (e.g., a VGA signal), and the interconnect signal 610c (e.g., an Ethernet signal) may be provided as portions of a second multiplexed signal by the operation of the signal transmission engine 202a and the multiplexer 602b. In an embodiment, each of the first and/or second multiplexed signals provided by the multiplexers 602a and 602b at block 304a of the method 300 may each be provided as separate, serial streams of data. In an embodiment, the signal transmission engine 202a may operate to code the multiplexed signals to identify each of the interconnect signals included in those multiplexed signal. In an embodiment, the cable 206 may be configured to transmit a management data stream from the source device 202 to the receive device 204 that includes information that identifies each of the interconnect signals included in the multiplexed signals.

Figure 7:
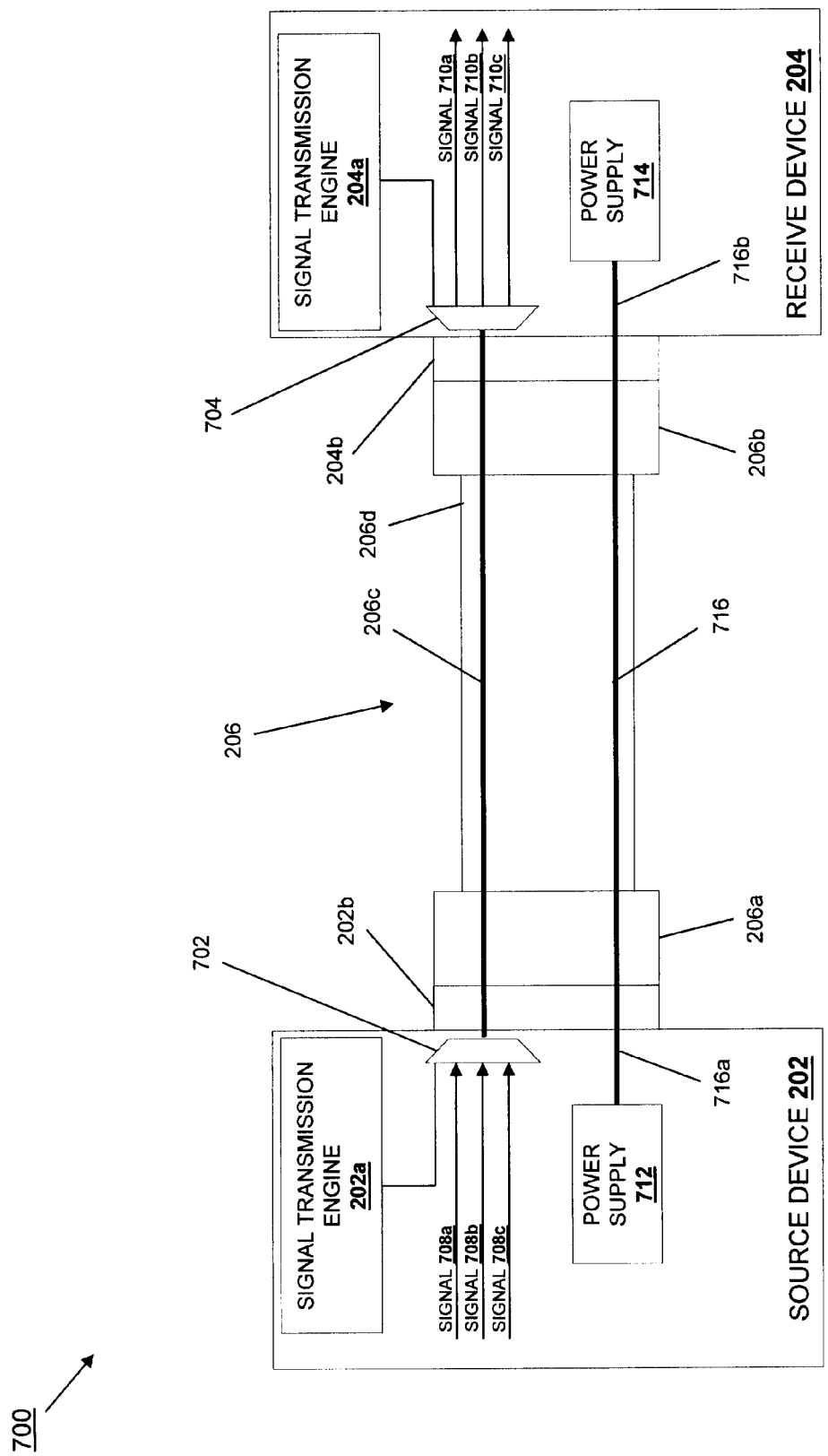
FIG. 7 is a schematic view illustrating an embodiment of the interconnect signal transmission system connector of FIG. 2 that provides for the transmission of power from the source device to the receive device.

FIG. 7 illustrates an embodiment of an interconnect signal transmission system 700 that is substantially similar to the interconnect signal transmission system 200, discussed above with reference to FIG. 2, but with the provision of multiplexing and demultiplexing components that enable optional block 304a of the method 300, as well as the provision of power components for providing power from the source device 202 to the receive device 204 over the cable 206, discussed in further detail below. As such, similar elements in the systems 200 and 700 include the same reference numbers. In the illustrated embodiment, the source device 202 includes a multiplexer 702 that is coupled to the signal transmission engine 202a. The receive device 204 includes a demultiplexer 704 that is coupled to the signal transmission engine 204a. The transmission line 206c extends between the multiplexer 702 and the demultiplexer 704.

At block 304a of the method 300, the source device 202 provides the interconnect signals (e.g., the interconnect signals 708a, 708b, and 708c) to the multiplexer 702 and, in response to receiving the interconnect signals, the signal transmission engine 202a and the multiplexer 702 operate to multiplex the interconnect signals of different interconnect technologies to provide a multiplexed signal. For example, each of the interconnect signal 708a (e.g., a USB signal), the interconnect signal 708b (e.g., a VGA signal), and the interconnect signal 708c (e.g., a SATA signal) may be provided as portions of a multiplexed signal by operation of the signal transmission engine 202a and the multiplexer 702. In an embodiment, the multiplexed signal provided by the multiplexer 702 at block 304a of the method 300 may be provided as a single, serial stream of data. In an embodiment, the signal transmission engine 202a may operate to code the multiplexed signal to identify each of the interconnect signals included in the multiplexed signal. In an embodiment, the cable 206 may be configured to transmit a separate management data stream from the source device 202 to the receive device 204 that includes information that identifies each of the interconnect signals included in the multiplexed signal.

Figure 8:
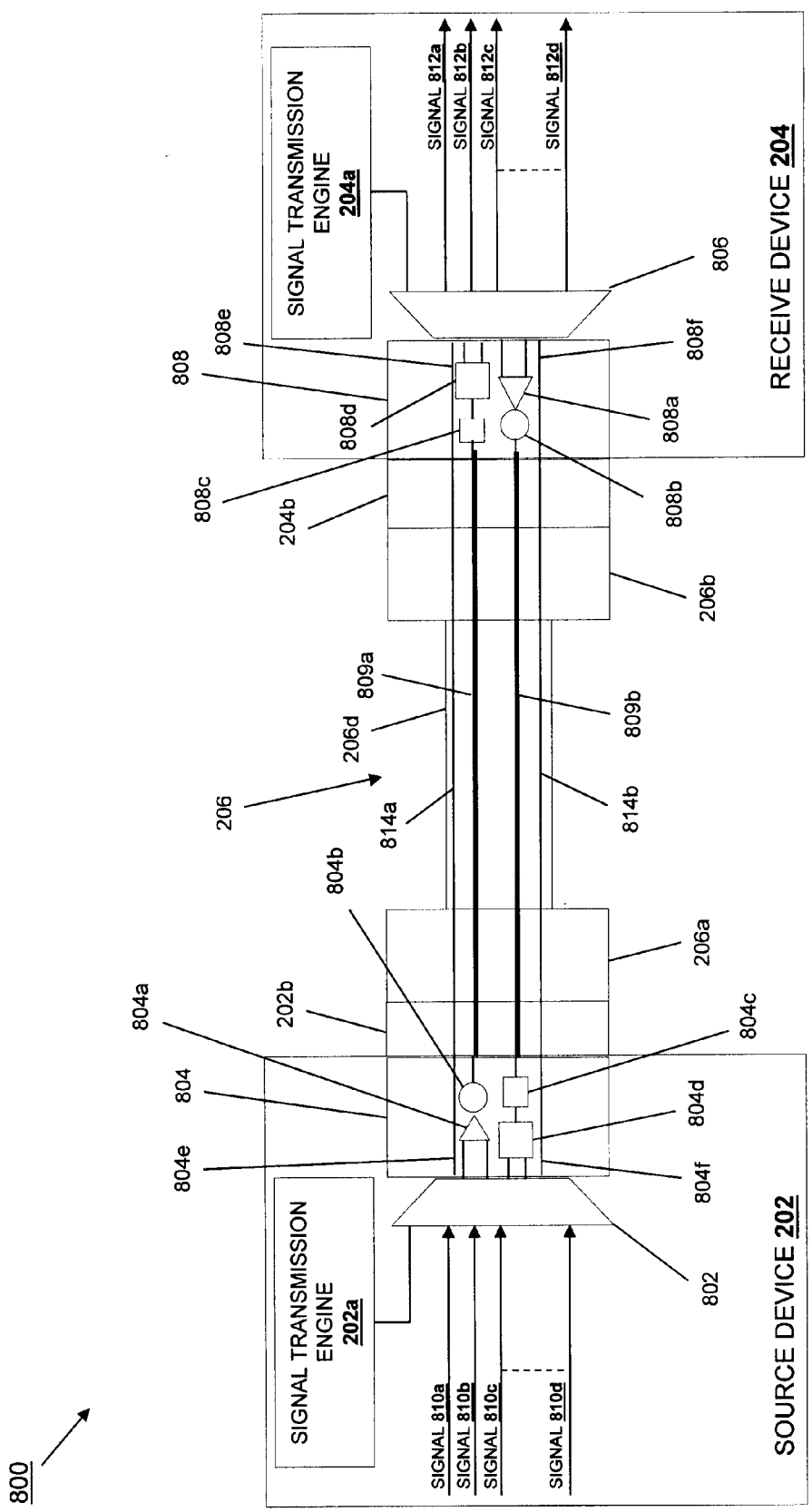
FIG. 8 is a schematic view illustrating an embodiment of the interconnect signal transmission system of FIG. 2 that provides for optical transmission of interconnect signals.

FIG. 8 illustrates an embodiment of an interconnect signal transmission system 800 that is substantially similar to the interconnect signal transmission system 200, discussed above with reference to FIG. 2, but with the provision of multiplexing and demultiplexing components that enable optional block 304a of the method 300, as well as the provision of optical components for transmitting interconnect signals from the source device 202 to the receive device 204 optically over the cable 206, discussed in further detail below. As such, similar elements in the systems 200 and 800 include the same reference numbers. In the illustrated embodiment, the source device 202 includes a multiplexer 802 that is coupled to the signal transmission engine 202a. An electrical-to-optical converter 804, discussed in further detail below, is coupled between the multiplexer 802 and the source device output connector 202b. The receive device 204 includes a demultiplexer 806 that is coupled to the signal transmission engine 204a. An optical-to-electrical converter 808, discussed in further detail below, is coupled between the demultiplexer 806 and the receive device input connector 204b. A pair of transmission lines 809a and 809b extend between the electrical-to-optical converter 804 and the optical-to-electrical converter 808. In the illustrated embodiment, the pair of transmission lines are fiber optic transmission line that may provide bi-directional transmission of interconnect signals between the source device 202 and the receive device 204. While the multiplexer 802 and electrical-to-optical converter 804 are illustrated as included in the source device 202, either or both may be provided in the first connector 206a similarly as discussed above with reference to FIG. 4. Similarly, while the demultiplexer 806 and optical-to-electrical converter 808 are illustrated as included in the receive device 204, either or both may be provided in the second connector 206b similarly as discussed above with reference to FIG. 4.

At block 304a of the method 300, the source device 202 provides the interconnect signals (e.g., the interconnect signals 810a, 810b, 810c, and up to 810d) to the multiplexer 802 and, in response to receiving the interconnect signals, the signal transmission engine 202a and the multiplexer 802 operate to multiplex the interconnect signals of different interconnect technologies to provide a multiplexed signal. For example, each of the interconnect signal 810a (e.g., a USB signal), the interconnect signal 810b (e.g., a PCIe signal), the interconnect signal 810c (e.g., an HDMI signal), and up to the interconnect signal 810d (e.g., an SATA signal) may be provided as portions of a multiplexed signal by the operation of the signal transmission engine 202a and the multiplexer 802. In an embodiment, the multiplexed signal provided by the multiplexer 802 at block 304a of the method 300 is provided as a single, serial stream of data. In the illustrated embodiment, the multiplexer 802 provides the multiplexed signal to the electrical-to-optical converter 804 as an electrical multiplexed signal. In an embodiment, the signal transmission engine 202a may operate to code the multiplexed signal to identify each of the interconnect signals included in the multiplexed signal. In an embodiment, the cable 206 may be configured to transmit a separate management data stream from the source device 202 to the receive device 204 that includes information that identifies each of the interconnect signals included in the multiplexed signal.

Thus, multiplexing of the plurality of interconnect signals to provide a multiplexed signal at optional block 304a of the method 300 may be performed in a variety of different ways, just a few of which are illustrated and described above. A variety of combinations of the embodiments discussed above may provide benefits in particular situations, and the locations and numbers of multiplexers and demultiplexers in the different embodiments may be varied according to desired functionality. For example, the sourcing device 202 may include a multiplexer and the second connector 206b on the cable 206 may include the demultiplexer. In another example, the first connector 206a on the cable 206 may include the multiplexer and the receive device 204 may include the demultiplexer. In another example, bi-directional interconnect signal transmission may be realized by providing multiplexers and demultiplexers in each of the source device 202 (or first connector 206a) and the receive device 204 (or second connector 206b) that are operable to transmit and receive multiplexed signals over the same transmission line 206c. Bi-directional interconnect signal transmission may also be realized by an interconnect signal transmission system similar to that illustrated in FIG. 6, but with the source device 202 including the multiplexer 602a connected by the transmission line 606a to the demultiplexer 604a in the receive device 204 (to transmit interconnect signals from the source device 202 to the receive device 204 as discussed herein), and with the receive device 204 including a multiplexer (in place of the demultiplexer 604b) connected by the transmission line 606b to a demultiplexer (in place of the multiplexer 602b) in the source device 202 (to transmit interconnect signals from the receive device 204 to the source device 202.)

With regard to interconnect signals provided to any of the multiplexers discussed above by multi-pin connectors, a variety of options for signals received from a single connector may be used in the multiplexing provided by the interconnect signal transmission systems. In an specific embodiment, USB interconnect signals from different pins on a single USB connector may be provided to different multiplexers (e.g., according to the embodiments illustrated in FIG. 6.) For example, a first USB interconnect signal from a first pin on a USB connector may be provided to a first multiplexer, while a second USB interconnect signal from a second pin on that USB connector may be provided to a second multiplexer, and so. In another embodiment, a plurality of USB signals from multiple pins on a single USB connector (e.g., more than one pin and up to all of the pins on that USB connector) may be combined into a USB interconnect signal that is provided to a multiplexer. For example, all of the signals coming from a USB connector may be modulated or multiplexed to provide the USB interconnect signal that is then provided to the multiplexer in the source device 202.

The method 300 may then proceed to optional block 304b where an optical signal is generated from the multiplexed signal. Referring now to FIG. 8, an embodiment of the electrical-to-optical converter 804 in the source device 202 includes a laser driver 804a coupled to a laser 804b, a diode 804c (e.g., a PIN diode) coupled to an amplifier 804d (e.g., a transimpedance amplifier), a power line 804e, and a ground line 804f. Similarly, the optical-to-electrical converter 808 in the receive device 202 includes a laser driver 808a coupled to a laser 808b, a diode 808c (e.g., a PIN diode) coupled to an amplifier 808d (e.g., a transimpedance amplifier), a power line 808e, and a ground line 808f. The transmission line 809a couples to the laser 804b in the electrical-to-optical converter 804 (e.g., via the engagement of the first connector 206a and the source device output connector 202b) and to the diode 808c in the optical-to-electrical converter 808 (e.g., via the engagement of the second connector 206b and the receive device input connector 204b.) Similarly, the transmission line 809b couples to the laser 808b in the optical-to-electrical converter 808 and to the diode 804c in the electrical-to-optical converter 804, a power line 814a in the cable 206 couples the power line 804e in the electrical-to-optical converter 804 to the power line 808e in the optical-to-electrical converter 808, and a ground line 814b in the cable 206 couples the ground line 804f in the electrical-to-optical converter 804 to the ground line 808f in the optical-to-electrical converter 808.

In an embodiment of optional block 304b, the signal transmission engine 202a and the multiplexer 802 operate to provide the multiplexed signal as an electrical differential pair signal to the laser driver 804a (indicated by the pair of inputs to the laser driver 804a) in the electrical-to-optical converter 804. The laser driver 804a then operates with the laser 804b to output an optical signal (indicated by the output from the laser 804b) that is an optical version of the electrical multiplexed signal provided by the multiplexer 802.

The method 300 then proceeds to block 306 where the plurality of interconnect signals are transmitted over the transmission line. In the embodiment illustrated in FIG. 4, the signal transmission engine 202a and the multiplexer 402 operate to provide the multiplexed signal, which was created at block 304a and which includes each of the interconnect signals 406a-d, over the transmission line 206c. In the embodiment illustrated in FIG. 5, the signal transmission engine 202a and the multiplexer 502 operate to provide the multiplexed signal, which was created at block 304a and which includes each of the interconnect signals 506a-d, over the transmission line 206c. In the embodiment illustrated in FIG. 6, the signal transmission engine 202a and the multiplexer 602a operate to provide the first multiplexed signal, which was created at block 304a and which includes each of the interconnect signals 608a-c, over the transmission line 606a, and the signal transmission engine 202a and the multiplexer 602b operate to provide the second multiplexed signal, which was created at block 304a and which includes each of the interconnect signals 610a-c, over the transmission line 606b. In an embodiment of the interconnect signal transmission system 600, the transmission lines 606a and 606b may transmit multiplexed signals at the same frequency and/or using the same encoding scheme. In the embodiment illustrated in FIG. 7, the signal transmission engine 202a and the multiplexer 702 operate to provide the multiplexed signal, which was created at block 304a and which includes each of the interconnect signals 708a-c, over the transmission line 206c. In the embodiment illustrated in FIG. 8, the signal transmission engine 202a, the multiplexer 802, and the electrical-to-optical converter 804 operate to provide the optical signal, that was created at block 304b of the method and that includes the multiplexed signal created at block 304a that includes each of the interconnect signals 810a-d, over the transmission line 809a.

Thus, embodiments of the interconnect signal transmission systems and methods discussed herein provide for the multiplexing of a plurality of different, relatively low speed interconnect signals (i.e. associated with different interconnect technologies) into a single, serial stream of data that may be transmitted at a relatively high speed over a transmission line in the cable 206. For example, when the single, serial stream is transmitted optically through a fiber optic transmission line in the cable 206, a greater reach/longer distance at higher data rates is achieved relative to the transmission of each of those electrical interconnect signals, for example, over copper transmission lines, as fiber optic cables support the transmission of high speed data over longer distances (depending on the optical transmission diodes) without signal loss.

The method 300 then proceeds to block 308 where the plurality of interconnect signals are prepared for distribution. In the illustrated embodiment, block 308 of the method 300 includes a plurality of optional blocks 308a and 308b which may be performed using the embodiments of the interconnect signal transmission systems introduced above. However, one of skill in the art in possession of the present disclosure will recognize that the signal transmission engine 204a in the receive device 204 may perform other actions on the interconnect signals received at block 308 to prepare those interconnect signals for distribution while remaining within the scope of the present disclosure. For example, if a copper cable is used, the electrical signal may be modulated and driven by a driver (e.g., a silicon driver). In another example, if a fiber optic cable is used, then the electrical bits may be converted to a light source, which requires the user of fiber optic diodes that convert the electrical bits to a series of light units, that is directed into the fiber optic cable medium. In several embodiments of block 308, the preparation of the interconnect signals received at block 308 for distribution does not modify the interconnect protocol of any of those signals, such that each of the interconnect signals transmitted natively and without translation of the interconnect protocol associated with those interconnect signals at block 306 are distributed having those same interconnect protocols.

In an embodiment, the method 300 may then proceed to optional block 308a where the optical signal is converted to the multiplexed signal. Referring now to FIG. 8, the optical signal provided by electrical-to-optical converter 804 (through operation of laser driver 804a and the laser 804b on the electrical multiplexed signal provided by the multiplexer 802) and transmitted over the transmission line 809a is received by the optical-to-electrical converter 808. That optical signal is provided to the diode 808c, which operates to output the electrical multilplexed signal from that optical signal. The electrical multilplexed signal from the diode 808c is then provided to the amplifier 808d, which operates on the electrical multilplexed signal to amplify and/or provide other processing of that electrical multilplexed signal in preparation for providing the electrical multiplexed signal to the demultiplexer 806. In an embodiment, the amplifier 808d outputs the multiplexed signal as an electrical differential pair signal (indicated by the pair of outputs from the amplifier 808d) from the current provided by the diode 808c.

In an embodiment, the method 300 may then proceed to optional block 304b where the multiplexed signal is demultiplexed to provide the plurality of interconnect signals. The embodiments of interconnect signal transmission systems, introduced above, are discussed below that provide for the demultiplexing of the multiplexed signal received at block 308, but those embodiments are not meant to be limiting, and a wide variety of modifications to the demultiplexing components and functionality discussed below are envisioned as falling within the scope of the present disclosure.

Referring now to FIG. 4, at block 308b of the method 300, the multiplexed signal passed over the transmission line 206c is received by the demultiplexer 404 in the second connector 206b. In response to receiving the multiplexed signal, the signal transmission engine 204a and the demultiplexer 404 operate to demultiplex the multiplexed signal to provide the plurality of interconnect signals of different interconnect technologies. For example, the multiplexed signal received by the demultiplexer 404 may be demultiplexed to provide each of the interconnect signal 408a (e.g., a USB signal), the interconnect signal 408b (e.g., an HDMI signal), the interconnect signal 408c (e.g., an Ethernet signal), and up to the interconnect signal 408d (e.g., a SATA signal). Thus, each of the interconnect signals 408a-d provided from the demultiplexing of the multiplexed signal may be the same as or substantially similar to the interconnect signals 406a-d, respectively, that were multiplexed to provide the multiplexed signal. For example, each interconnect signal provided from demultiplexing the multiplexed signal (e.g., interconnect signal 408a) may include the same signal value and be associated with the same interconnect technology (e.g., USB interconnect technology) as the interconnect signal that was multiplexed with other interconnect signals to provide the multiplexed signal (e.g., interconnect signal 406a). In an embodiment, the signal transmission engine 204a may utilize coding in the multiplexed signal, or a separate management data stream provided from the source device 202 in the demultiplexing of the multiplexed signal. In some embodiments, identification of the interconnect signals in the multiplexed signal(s) may allow the receive device 204 to retrieve select interconnect signals from the multiplexed signal (e.g., some, but not all, of the interconnect signals that make up the multiplexed signal.)

Referring now to FIG. 5, at block 308b of the method 300, the multiplexed signal passed over the transmission line 206c is received by the demultiplexer 504 in the receive device 204. In response to receiving the multiplexed signal, the signal transmission engine 204a and the demultiplexer 504 operate to demultiplex the multiplexed signal to provide the plurality of interconnect signals of different interconnect technologies. For example, the multiplexed signal received by the demultiplexer 504 may be demultiplexed to provide each of the interconnect signal 508a (e.g., a DVI signal), the interconnect signal 508b (e.g., a PCIe signal), the interconnect signal 508c (e.g., an DisplayPort signal), and up to the interconnect signal 508d (e.g., an IDE signal). Thus, each of the interconnect signals 508a-d provided from the demultiplexing of the multiplexed signal may be substantially similar to the interconnect signals 506a-d, respectively, that were multiplexed to provide the multiplexed signal. For example, each interconnect signal provided from demultiplexing the multiplexed signal (e.g., interconnect signal 508a) may include the same signal value and be associated with the same interconnect technology (e.g., DVI interconnect technology) as the interconnect signal that was multiplexed with other interconnect signals to provide the multiplexed signal (e.g., interconnect signal 506a). In an embodiment, the signal transmission engine 204a may utilize coding in the multiplexed signal or a management data stream provided from the source device 202 in the demultiplexing of the multiplexed signal. In some embodiments, identification of the interconnect signals in the multiplexed signal(s) may allow the receive device 204 to retrieve select interconnect signals from the multiplexed signal (e.g., some, but not all, of the interconnect signals that make up the multiplexed signal.)

Referring now to FIG. 6, at block 308b of the method 300, the first multiplexed signal passed over the transmission line 606a is received by the demultiplexer 604a in the receive device 204, and the second multiplexed signal passed over the transmission line 606b is received by the demultiplexer 604b in the receive device 204. In response to receiving the multiplexed signal, the signal transmission engine 204a and each of the demultiplexers 606a and 606b operate to demultiplex the multiplexed signals to provide the plurality of interconnect signals of different interconnect technologies. For example, the first multiplexed signal received by the demultiplexer 606a may be demultiplexed to provide each of each of the interconnect signal 612a (e.g., a USB signal), the interconnect signal 612b (e.g., a DisplayPort signal), and the interconnect signal 612c (e.g., an Ethernet signal), and the second multiplexed signal received by the demultiplexer 606b may be demultiplexed to provide each of the interconnect signal 614a (e.g., a USB signal), the interconnect signal 614b (e.g., a VGA signal), and the interconnect signal 614c (e.g., an Ethernet signal). Thus, each of the interconnect signals 612a-c and 614a-c provided from the demultiplexing of the first and second multiplexed signals may be substantially similar to the interconnect signals 608a-c and 610a-c, respectively, that were multiplexed to provide the multiplexed signal. For example, each interconnect signal provided from demultiplexing the multiplexed signal (e.g., interconnect signal 612a) may include the same signal value and be associated with the same interconnect technology (e.g., USB interconnect technology) as the interconnect signal that was multiplexed with other interconnect signals to provide the multiplexed signal (e.g., interconnect signal 608a). In an embodiment, the signal transmission engine 204a may utilize coding in the multiplexed signal or a management data stream provided from the source device 202 in the demultiplexing of the multiplexed signal. In some embodiments, identification of the interconnect signals in the multiplexed signal(s) may allow the receive device 204 to retrieve select interconnect signals from the multiplexed signal (e.g., some, but not all, of the interconnect signals that make up the multiplexed signal.)

Referring now to FIG. 7, at block 308b of the method 300, the multiplexed signal passed over the transmission line 206c is received by the demultiplexer 704 in the receive device 204. In response to receiving the multiplexed signal, the signal transmission engine 204a and the demultiplexer 704 operate to demultiplex the multiplexed signal to provide the plurality of interconnect signals of different interconnect technologies. For example, the multiplexed signal received by the demultiplexer 704 may be demultiplexed to provide each of the interconnect signal 710a (e.g., a USB signal), the interconnect signal 710b (e.g., a VGA signal), and the interconnect signal 710c (e.g., a SATA signal). Thus, each of the interconnect signals 708a-c provided from the demultiplexing of the multiplexed signal may be the same as or substantially similar to the interconnect signals 710a-c, respectively, that were multiplexed to provide the multiplexed signal. For example, each interconnect signal provided from demultiplexing the multiplexed signal (e.g., interconnect signal 710a) may include the same signal value and be associated with the same interconnect technology (e.g., USB interconnect technology) as the interconnect signal that was multiplexed with other interconnect signals to provide the multiplexed signal (e.g., interconnect signal 708a). In an embodiment, the signal transmission engine 204a may utilize coding in the multiplexed signal or a management data stream provided from the source device 202 in the demultiplexing of the multiplexed signal. In some embodiments, identification of the interconnect signals in the multiplexed signal(s) may allow the receive device 204 to retrieve select interconnect signals from the multiplexed signal (e.g., some, but not all, of the interconnect signals that make up the multiplexed signal.)

Referring now to FIG. 8, at block 308b of the method 300, the electrical multiplexed signal provided from the optical-to-electrical converter 808 is received by the demultiplexer 806 in the receive device 204. In response to receiving the multiplexed signal, the signal transmission engine 204a and the demultiplexer 806 operate to demultiplex the multiplexed signal to provide the plurality of interconnect signals of different interconnect technologies. For example, the multiplexed signal received by the demultiplexer 806 may be demultiplexed to provide each of the interconnect signal 812a (e.g., a USB signal), the interconnect signal 812b (e.g., a PCIe signal), the interconnect signal 812c (e.g., an HDMI signal), and up to the interconnect signal 812d (e.g., an SATA signal). Thus, each of the interconnect signals 812a-d provided from the demultiplexing of the multiplexed signal may be substantially similar to the interconnect signals 810a-d, respectively, that were multiplexed to provide the multiplexed signal. For example, each interconnect signal provided from demultiplexing the multiplexed signal (e.g., interconnect signal 812a) may include the same signal value and be associated with the same interconnect technology (e.g., USB interconnect technology) as the interconnect signal that was multiplexed with other interconnect signals to provide the multiplexed signal (e.g., interconnect signal 810a). In an embodiment, the signal transmission engine 204a may utilize coding in the multiplexed signal or a management data stream provided from the source device 202 in the demultiplexing of the multiplexed signal. In some embodiments, identification of the interconnect signals in the multiplexed signal(s) may allow the receive device 204 to retrieve select interconnect signals from the multiplexed signal (e.g., some, but not all, of the interconnect signals that make up the multiplexed signal.)

While the multiplexer 802, electrical-to-optical converter 804, demultiplexer 806, and optical-to-electrical converter 808 are illustrated in FIG. 8 in a specific order, variations of those components and that order will fall within the scope of the present disclosure. For example, the electrical-to-optical converter 804 may receive electrical interconnect signals and convert them to optical interconnect signals, and then an optical multiplexor may multiplex those optical interconnect signals into an optical multiplexed signal for transmission. Following transmission, an optical demultiplexer may demultiplex the optical multiplexed signal to provide the optical interconnect signals, and the optical-to-electrical converter may convert those optical interconnect signals to electrical interconnect signals.

Thus, demultiplexing of the multiplexed signal to provide the plurality of interconnect signals at optional block 308b of the method 300 may be performed in a variety of different ways, just a few of which are illustrated and described above. A variety of combinations of the embodiments discussed above may provide benefits in particular situations, and the locations and numbers of multiplexers and demultiplexers in the different embodiments may be varied according to desired functionality.

The method 300 then proceeds to block 310 where the plurality of interconnect signals are distributed. In an embodiment, the signal transmission engine 204a may operate (alone, or with other components of the receive system 204) to distribute the plurality of interconnect signals to their destinations. Thus, USB interconnect signals may be distributed to USB connected devices, HDMI interconnect signals may be distributed to HDMI connected devices, SATA interconnect signals may be distributed within the receive device 204, and so on.

The method 300 may then proceed to optional block 312 where the receive device is provided power from the source device. As discussed below, the cable 206 may transmit power, along with interconnect signals in order to reduce the number of cables necessary to provide an information handling system. While a few examples are provided, one of skill in the art in possession of the present disclosure will recognize that power may be transmitted from the source device to the receive device in a variety of other manners while remaining within the scope of the present disclosure.

As discussed above, FIG. 7 illustrates an embodiment of an interconnect signal transmission system 700 that is substantially similar to the interconnect signal transmission system 200, discussed above with reference to FIG. 2, but with the provision of power components for providing power from the source device 202 to the receive device 204 over the cable 206. As such, similar elements in the systems 200 and 700 include the same reference numbers. In the illustrated embodiment, the source device 202 includes a power supply 712 that may include, for example, a power supply unit (PSU) or other power supply systems known in the art. The receive device 204 includes a power supply 714 that may include, for example, a power supply unit (PSU) or other power supply systems known in the art. A power line 716 extends between the first connector 206a and the second connector 206b through the cable 206. With the first connector 206a engaged with the source device output connector 202b and the second connector 206b engaged with the receive device input connector 204b, the power line 716 is coupled to the power supply 712 through a power connection 716a, and to the power supply 714 through a power connection 716b. At optional block 312 of the method 300, the power supply 712 in the source device 202 may be coupled to a power source (e.g., a wall outlet) such that power is transmitted over the power connection 716a, through the power line 716, over the power connection 716b and to the power supply 714 in the receive device 204. In some embodiments, the power supply 712 in the source device 202 may be configured to draw sufficient power, and regulate that power, for both the source device 202 and the receive device 204, eliminating the need for the power supply 714 in the receive device 204.

Referring now to FIG. 8, at optional block 312 of the method 300, the power and ground connections between the electrical-to-optical converter 804 and the optical-to-electrical converter 808 may be utilized to transmit power from the source device 202 to the receive device 204. For example, power from a power supply in the source device 202 (not illustrated, but similar to the power supply 712 discussed above) may be provided over the power line 804e in the electrical-to-optical converter 804 to the power line 814a in the cable 206, and through the power line 808e in the optical-to-electrical converter 808 to a power supply in the receive device 204 (not illustrated, but similar to the power supply 714 discussed above).

Figure 9:
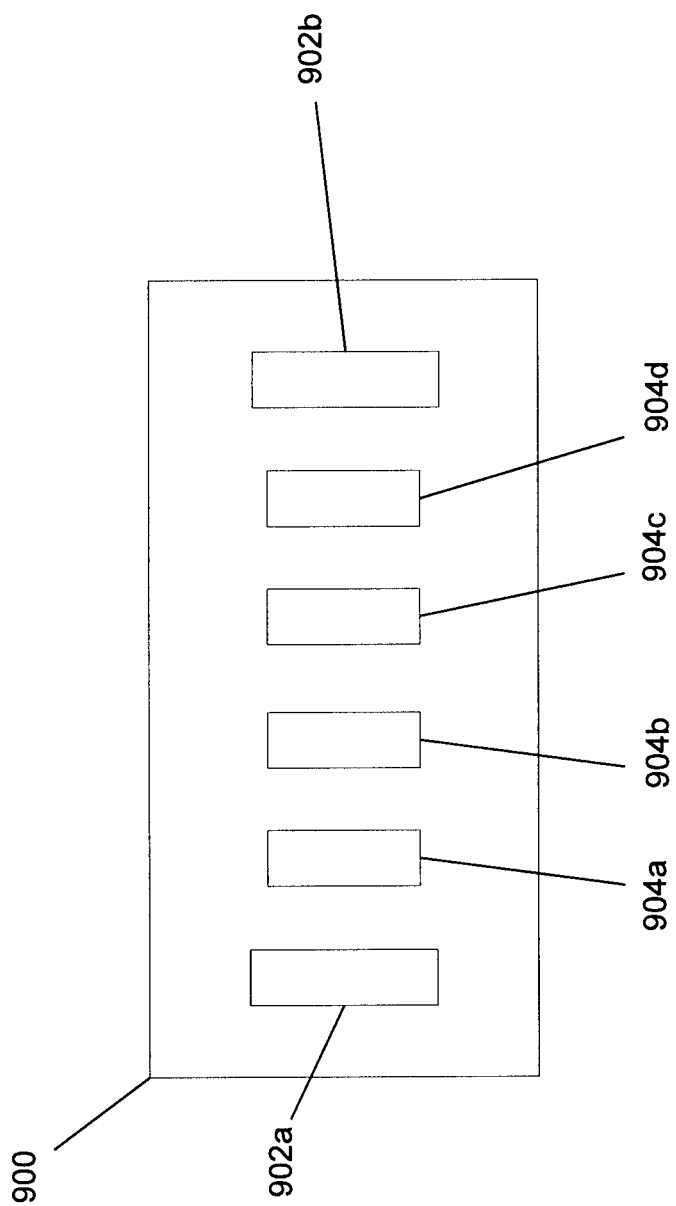
FIG. 9 is a schematic view illustrating an embodiment of a cable connector on the interconnect signal transmission system of FIG. 2.

Referring now to FIG. 9, an embodiment of an interconnect signal transmission system connector 900 is illustrated. In an embodiment, the connector 900 may be the first connector 206a and/or the second connector 206b on the cable 206 in the interconnect signal transmission system 800 discussed above. In the illustrated embodiment, the connector 900 includes a pair of power connections 902a and 902b (e.g., to couple to the power lines 804e, 808e and the ground lines 804f, 808f of the interconnect signal transmission system 800), along with data connections 904a and 904b (e.g., to receive optical signals from the laser drivers and lasers the interconnect signal transmission system 800) and data connections 904c and 904d (e.g., to send optical signals to the diodes and amplifiers the interconnect signal transmission system 800). While illustrated with a single pair of power connections 902a and 902b, multiple pairs of power connections may be provided on the interconnect signal transmission system connector 900 to increase the power carrying capacity of the cable 206.

In another embodiment, each of the power connections 902a and 902b may be configured to pass power in the same direction (e.g., from the source device 202 to the receive device 204) to double the power capacity of the cable 206, while each data connection 904a-d may be configured to pass a multiplexed signal over a respective transmission line. In an embodiment, the data connections 904a-d may be connected to transmission lines that are configured to pass signals in either direction, allowing the cable to be connected to the system in more than one orientation. In another embodiment, the power connection 902a may be configured to pass power from the source device 202 (to the receiving device 204), while the power connection 902b may be configured to pass power to the source device 202 (e.g., from the receiving device 204). In another example, the power connections 902a and 902b may be configured to pass power in both directions between the source device 202 and the receiving device 204. In some embodiments, the power connections 902a and 902b may be magnetic. In some embodiments, the power connections 902a and 902b may deliver power inductively. In an embodiment, the data connections 904a and 904b may provide a first twisted pair, while the data connections 904c and 904d may provide a second twisted pair. In some embodiments, the data connections 904a-d may each provide a coupling for a respective interconnect signal to a multiplexer (or multiple multiplexers) in the connector.

Figure 10:
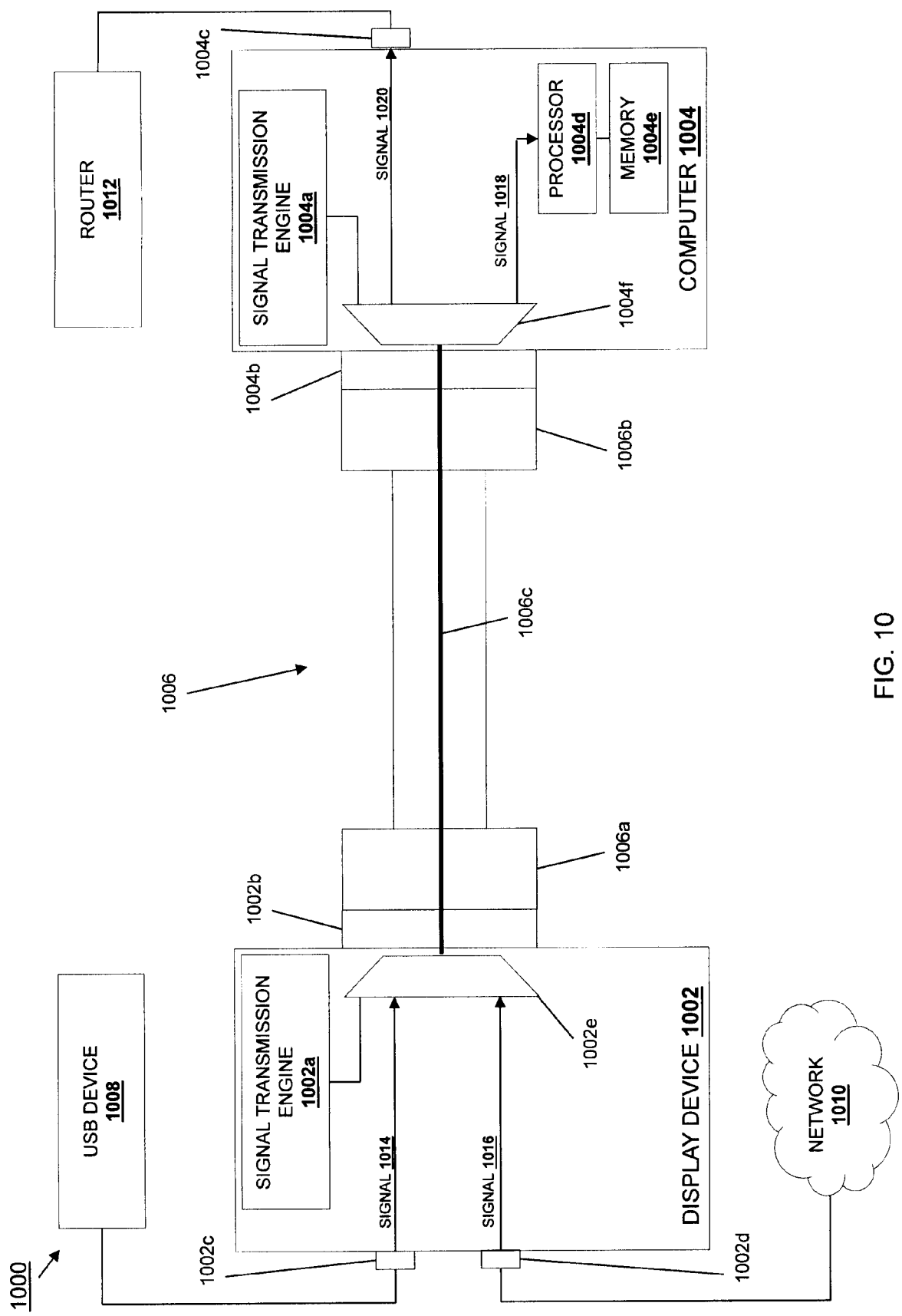
FIG. 10 is a schematic view illustrating a specific embodiment of the interconnect signal transmission system of FIG. 5.

Referring now to FIG. 10, a specific embodiment of an information handling system 1000 according to the teachings of the present disclosure is illustrated. The IHS 1000 includes a display device 1002, which may be the source device 202 discussed above. The display device 1002 includes a signal transmission engine 1002a, which may be the signal transmission engine 202a discussed above. The display device 1002 also includes a display device output connector 1002b, which may be the source device output connector 202b discussed above. A USB input connector 1002c and an Ethernet input connector 1002d are provided on the display device 1002. A multiplexer 1002e is included in the display device 1002 and coupled to the signal transmission engine 1002a, the display device output connector 1002b, and each of the USB input connector 1002c and the Ethernet input connector 1002d.

The IHS 1000 also includes a computer 1004, which may be the receive device 204 discussed above. The computer 1004 includes a signal transmission engine 1004a, which may be the signal transmission engine 204a discussed above. The computer 1004 also includes a computer input connector 1004b, which may be the receive device input connector 204b discussed above. An Ethernet output connector 1004c is provided on the computer 1004. A processor 1004d is housed in the computer 1004 and coupled to a memory 1004e that is also housed in the computer 1004. A demultiplexer 1004f is included in the display device 1002 and coupled to the signal transmission engine 1004a, the computer input connector 1004b, the Ethernet output connector 1004c, and the processor 1004d.

The cable 1006, which may be the cable 206 discussed above, couples the display device 1002 to the computer 1004 through the engagement of a first connector 1006a, which may be the first connector 206a discussed above, with the display device output connector 1002, and the engagement of the second connector 1006b, which may be the second connector 206b, with the computer input connector 1004b. A transmission line 1006c, which may be the transmission line 206c discussed above, extends between the multiplexer 1002e and the demultiplexer 1004f. A USB device 1008 is coupled to the USB input connector 1002c on the display device 1002, and a network 1010 is coupled to the Ethernet input connector 1002d on the display device 1002. A router 1012 is coupled to the Ethernet output connector 1004c on the computer 1004.

In operation according to the method 300, the display device 1002 receives USB interconnect signals 1014 from the USB device 1008 over the USB input connector 1002c, and receives Ethernet interconnect signals 1016 from the network 1010 through the Ethernet input connector 1002d. The USB interconnect signals 1014 and the Ethernet interconnect signals 1016 are provided to the multiplexer 1002e, and the signal transmission engine 1002a and the multiplexer 1002e operate to multiplex the USB interconnect signal 1014 and the Ethernet interconnect signal 1016 to provide a multiplexed signal. That multiplexed signal is provided in a single, serial data stream over the transmission line 1006c to the demultiplexer 1004f, and the signal transmission engine 1004a and the demultiplexer 1004f operate to demultiplex the multiplexed signal to provide a USB interconnect signal 1018 that is the same as the USB interconnect signal 1014, and an Ethernet interconnect signal 1020 that is the same as the Ethernet interconnect signal 1016. The signal transmission engine 1004a and/or other components in the computer 1004 (e.g., circuitry, the processor 1004d, etc.) then operate to distribute the USB interconnect signal 1018 to the processor 1004d, and to distribute the Ethernet interconnect signal 1020 to the router 1012 through the Ethernet output connector 1004c. In some embodiments, the computer 1004 may send return signals back to the display device 1002. In such embodiments, the computer 1004 may include a multiplexer (e.g., similar to the multiplexer 1002e in the display device 1002), and the display device 1002 may include a demultiplexer (e.g., similar to the demultiplexer 1004f in the computer 1004), and the transmission line 1006c (or other transmission lines in the cable 1006) will pass a plurality of return signals, each associated with a different interconnect technology, from the computer 1004 to the display device 1002. Similarly, the interconnect signal transmission system 800 discussed above with reference to FIG. 8 provides for return signals over the transmission line 809b in the substantially the same manner as described above for the transmission line 809a. In an embodiment, the router 1012 may be coupled to the computer 1004 by a cable similar to the cable 1006 and the computer 1004 and router 1012 may be configured to operate substantially as discussed above with regard to the source device 202 and receive device 204 discussed above.

Thus, interconnect signal transmission systems and methods have been described that allow devices to access multiple interconnect technologies over a single cable connection. The systems discussed herein may internalize the circuitry needed for interconnect technologies rather than requiring multiple interconnect ports on their external surfaces. This internalization enables devices to be designed with thinner profiles and smaller sizes. The systems and methods allow multiple devices to access an external interconnect port type (e.g. a USB port) located on another connected device, which is particularly useful when those multiple devices do not include that external interconnect port type. Through simplifying or combining circuitry or cables, the systems and methods enable reduced power consumption compared to conventional systems. Furthermore, the systems and methods transmit interconnect signals natively without translation from one protocol to another, eliminating the need for translation engines and the power required to provide such translations. Further still, the systems and methods described herein provide the ability to "future-proof" a device by not limiting that device to specific interconnect requirements and technologies.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An interconnect signal transmission system, comprising:
   a cable comprising:
      a first connector that is configured to couple to a source device;
      a second connector that is configured to couple to a receive device;
      a signal transmission engine that is coupled to the first connector and that is configured to:
         receive a first signal of a first interconnect technology and a second signal of a second interconnect technology through the first connector;
         multiplex the first signal of the first interconnect technology and the second signal of the second interconnect technology into a multiplexed signal without changing a protocol of either of the first signal of the first interconnect technology and the second signal of the second interconnect technology; and generate information that identifies each of the first signal of the first interconnect technology and the second signal of the second interconnect technology in the multiplexed signal; and a transmission line extending between the first connector and the second connector, wherein the transmission line is configured to:

pass the multiplexed signal in a single serial data stream from the first connector to the second connector; and pass a separate management data stream that is separate from the single serial data stream and that includes the information that identifies each of the first signal of the first interconnect technology and the second signal of the second interconnect technology in the multiplexed signal from the first connector to the second connector.

2. The interconnect signal transmission system of claim 1, wherein the signal transmission engine is configured to:

code the multiplexed signal to identity each of the first signal of the first interconnect technology and the second signal of the second interconnect technology, wherein the coding of the multiplexed signal to identify each of the first signal of the first interconnect technology and the second signal of the second interconnect technology allows for accessing the first signal of the first interconnect technology and the second signal of the second interconnect technology by demultiplexing of the multiplexed signal without performing decoding operations.

3. The interconnect signal transmission system of claim 1, further comprising:

a demultiplexer that is coupled to the second connector and that is configured to:

receive the multiplexed signal that includes the first signal of the first interconnect technology and the second signal of the second interconnect technology in the single serial data stream;

receive the separate management data stream that includes the information that identifies each of the first signal of the first interconnect technology and the second signal of the second interconnect technology in the multiplexed signal; and demultiplex the multiplexed signal using the separate management data stream.

4. The interconnect signal transmission system of claim 1, wherein the transmission line is configured to:

pass, from the second connector to the first connector, a first return signal of the first interconnect technology; and pass, from the second connector to the first connector, a second return signal of the second interconnect technology.

5. The interconnect signal transmission system of claim 1, further comprising:

an electrical to optical adapter that is coupled to the first connector and that is configured to:

generate an optical signal from the multiplexed signal that includes the first signal of the first interconnect technology and the second signal of the second interconnect technology, wherein the transmission line is a fiber optic line.

6. The interconnect signal transmission system of claim 1, further comprising:

an optical to electrical adapter that is coupled to the second connector and that is configured to:

receive an optical signal passed through the transmission line, wherein the transmission line is a fiber optic line.

7. The interconnect signal transmission system of claim 1, further comprising:

a plurality of transmission lines extending between the first connector and the second connector, wherein each of the plurality of transmission lines is configured to:

pass, from the first connector to the second connector, a plurality of signals that are each of a different interconnect technology, wherein each of the plurality of transmission lines has a transmission bandwidth equal to at least the sum of a maximum transmission bandwidth of each of the different interconnect technologies.

8. An information handling system (IHS), comprising:

a source device comprising:

a first source device input connector of a first interconnect technology;

a second source device input connector of a second interconnect technology;

a source device output connector; and a signal transmission engine that is coupled to the source device output connector and that is configured to:

receive a first signal of the first interconnect technology and a second signal of the second interconnect technology through the source device output connector;

multiplex the first signal of the first interconnect technology and the second signal of the second interconnect technology to provide a multiplexed signal without changing a protocol of either of the first signal of the first interconnect technology and the second signal of the second interconnect technology; and generate information that identities each of the first signal of the first interconnect technology and the second signal of the second interconnect technology in the multiplexed signal;

a cable comprising:

a first connector that is coupled to the source device output connector;

a second connector; and a transmission line extending between the first connector and the second connector; and a receive device coupled to the second connector, wherein the transmission line is configured to:

pass the multiplexed signal in a single serial data stream from the first connector to the second connector; and pass a separate management data stream that is separate from the single serial data stream and that includes the information that identifies each of the first signal of the first interconnect technology and the second signal of the second interconnect technology in the multiplexed signal from the first connector to the second connector.

9. The IHS of claim 8, wherein the first signal of the first interconnect technology is generated by a first peripheral device coupled to the first source device input connector; and wherein the second signal of the second interconnect technology is generated by a second peripheral device coupled to the second source device input connector.

10. The IHS of claim 8, further comprising:
a demultiplexer that is coupled to the second connector and configured to:
demultiplex the multiplexed signal into the first signal of the first interconnect technology and the second signal of the second interconnect technology using the separate management data stream, wherein the multiplexing of the first signal of the first interconnect technology and the second signal of the second interconnect technology to provide the multiplexed signal without changing the protocol of the first signal of the first interconnect technology and the second signal of the second interconnect technology, and the generating the information that identifies each of the first signal of the first interconnect technology and the second signal of the second interconnect technology in the multiplexed signal that is included in the separate management data stream, allows for accessing the first signal of the first interconnect technology and the second signal of the second interconnect technology by demultiplexing of the multiplexed signal without performing decoding operations.

11. The IHS of claim 10, wherein the receive device further comprises:
circuitry and a processor, wherein the circuitry is configured to;
forward the first signal of the first interconnect technology to the processor; and
forward the second signal of the second interconnect technology through a secondary cable to a secondary device coupled to the receive device.

12. The IHS of claim 8, wherein the cable further comprises:
a power line, and wherein the source device is configured to provide power to the receive device through the power line.

13. The IHS of claim 8, further comprising:
an electrical to optical converter that is coupled to the first connector and configured to generate an optical signal; and
an optical to electrical converter that is coupled to the second connector and configured to convert the optical signal into an electrical signal;
wherein the transmission line is a fiber optic line.

14. The IHS of claim 8, wherein:
the source device is a display device;
the receive device is a computer;
the first interconnect technology is a universal serial bus (USB) technology; and
the second interconnect technology is a High Definition Multimedia Interface (HDMI) technology.

15. A method for transmitting interconnect signals, comprising:
receiving, by a signal transmission engine from a source device, a first signal of a first interconnect technology through a single source device connection with the source device;
receiving, by the signal transmission engine from the source device, a second signal of a second interconnect technology through the single source device connection with the source device;
multiplexing, by the signal transmission engine, the first signal of the first interconnect technology and the second signal of the second interconnect technology to provide a multiplexed signal without changing a protocol of either of the first signal of the first interconnect technology and the second signal of the second interconnect technology;
generating by the signal transmission engine, information that identifies each of the first signal of the first interconnect technology and the second signal of the second interconnect technology in the multiplexed signal; and
providing, by the signal transmission engine over a transmission line, the multiplexed signal in a single serial data stream, and a separate management data stream that is separate from the single serial data stream and that includes the information that identifies each of the first signal of the first interconnect technology and the second signal of the second interconnect technology in the multiplexed signal to a receive device.

16. The method of claim 15, further comprising:
demultiplexing the multiplexed signal to access the first signal of the first interconnect technology and the second signal of the second interconnect technology using the separate management data stream, wherein the multiplexing of the first signal of the first interconnect technology and the second signal of the second interconnect technology to provide the multiplexed signal without changing the protocol of the first signal of the first interconnect technology and the second signal of the second interconnect technology, and the generating the information that identifies each of the first signal of the first interconnect technology and the second signal of the second interconnect technology in the multiplexed signal, allows for accessing the first signal of the first interconnect technology and the second signal of the second interconnect technology by demultiplexing of the multiplexed signal without performing decoding operations.

17. The method of claim 16, further comprising:
generating an optical signal of the multiplexed signal;
passing the optical signal over the transmission line; and
converting the optical signal back into one or more electrical signals, wherein the transmission line is a fiber optic line.

18. The method of claim 16,
wherein the multiplexed signal is demultiplexed subsequent to passing the multiplexed signal over the transmission line.

19. The method of claim 15, further comprising:
coupling, through a power line included in the cable, the receive device to a power source provided by the source device.

20. The method of claim 15, further comprising:
passing a first return signal of the first interconnect technology from the receive device over the transmission line and to the source device; and
passing a second return signal of the second interconnect technology from the receive device over the transmission line and to the source device.

* * * * *

UNITED STATES PATENT AND TRADEMARK OFFICE
CERTIFICATE OF CORRECTION

| | | |
|---|---|---|
| PATENT NO. | : 9,628,196 B2 | Page 1 of 1 |
| APPLICATION NO. | : 13/974740 | |
| DATED | : April 18, 2017 | |
| INVENTOR(S) | : Liam B. Quinn and Bradley J. Booth | |

It is certified that error appears in the above-identified patent and that said Letters Patent is hereby corrected as shown below:

On the Title Page

Under (72): please add inventor --Bradley J. Booth--;

In the Claims

In Column 21, Line 21: in Claim 2, please replace "identity" with --identify--;

In Column 22, Line 39: in Claim 8, please replace "identities" with --identifies--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*